(12) United States Patent
Jacobs et al.

(10) Patent No.: US 12,744,272 B2
(45) Date of Patent: Sep. 22, 2026

(54) BATTERY MODULE CELL CARRIER AND METHOD OF ASSEMBLY

(71) Applicant: Rivian IP Holdings, LLC, Irvine, CA (US)

(72) Inventors: Tyler Jacobs, Redondo Beach, CA (US); Kyle Butterfield, Ladera Ranch, CA (US); Chad Jackson Hardgrove, Tustin, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/691,530

(22) Filed: Mar. 10, 2022

(65) Prior Publication Data

US 2023/0291047 A1 Sep. 14, 2023

(51) Int. Cl.

| | |
|---|---|
| ***H01M 50/213*** | (2021.01) |
| ***H01M 50/258*** | (2021.01) |
| ***H01M 50/291*** | (2021.01) |
| ***H01M 50/463*** | (2021.01) |

(52) U.S. Cl.

CPC ....... *H01M 50/213* (2021.01); *H01M 50/258* (2021.01); *H01M 50/291* (2021.01); *H01M 50/463* (2021.01)

(58) Field of Classification Search

CPC .................................................. H01M 50/258

See application file for complete search history.

(56) References Cited

U.S. PATENT DOCUMENTS

| | | | | |
|---|---|---|---|---|
| 6,479,185 | B1 * | 11/2002 | Hilderbrand | H01M 10/613 429/62 |
| 2016/0329538 | A1 * | 11/2016 | Hughes | H01M 50/227 |
| 2019/0296407 | A1 * | 9/2019 | Newman | H01M 10/6555 |
| 2020/0227696 | A1 | 7/2020 | Matsumoto et al. | |
| 2021/0126302 | A1 * | 4/2021 | Hooper | H01M 10/643 |
| 2021/0184190 | A1 * | 6/2021 | Lee | H01M 50/24 |

FOREIGN PATENT DOCUMENTS

| | | | |
|---|---|---|---|
| WO | 2021/178196 | A2 | 9/2021 |

* cited by examiner

*Primary Examiner* — Jonathan G Leong
*Assistant Examiner* — Drew C Newman
(74) *Attorney, Agent, or Firm* — HG Law LLP

(57) ABSTRACT

A cell carrier for a battery module, a battery module including the cell carrier, and a method of assembling a battery module are provided. The cell carrier includes a multi-sided base. The multi-sided base includes a plurality of through-holes arranged in a predetermined pattern. Each through-hole includes an inner sidewall configured to hold one of a plurality of battery cells.

19 Claims, 16 Drawing Sheets

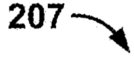
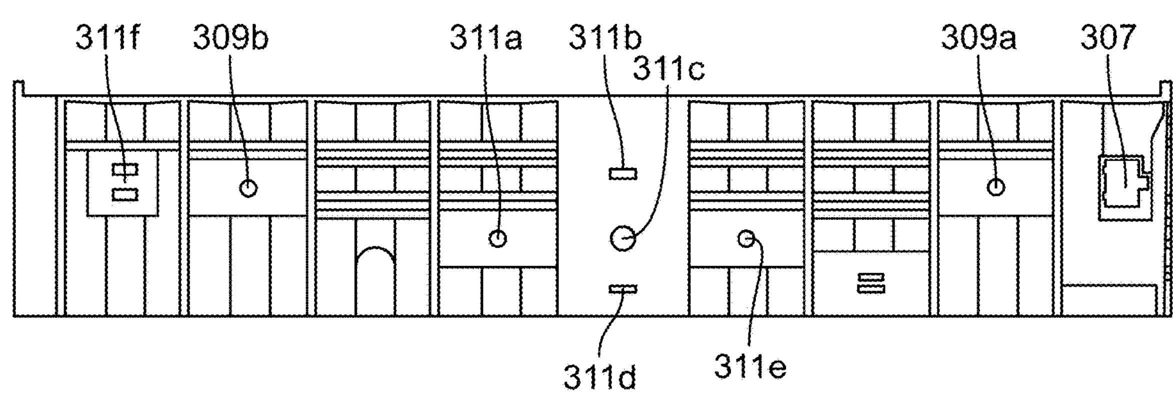
FIG. 3B
209
309d
309c
FIG. 3C 201a
1303
201b
1301

BATTERY MODULE CELL CARRIER AND METHOD OF ASSEMBLY

INTRODUCTION

The present disclosure is directed to a cell carrier for a battery module, a battery module including the cell carrier, and a method for assembling a battery module, and more particularly, to a one-piece cell carrier that allows for a reduction of parts of a battery module and a reduction of assembly steps in assembling the battery module.

SUMMARY

It is advantageous to package battery cells closely in high-voltage, large-format battery modules to provide high energy density battery modules. In one approach, battery cells may be inserted into a carrier layer of a battery module before sidewalls are attached to the sides of the battery module (e.g., using an adhesive). However, in some embodiments, it would be advantageous to reduce the number of parts required in the assembly of a battery module, in order to, e.g., simplify assembly.

To solve one or more of these problems, a cell carrier for a battery module, a battery module including the cell carrier, and a method of assembling the battery module are provided. The cell carrier includes a multi-sided base including a plurality of through-holes arranged in a predetermined pattern. Each through-hole includes an inner sidewall configured to hold one of a plurality of battery cells.

In some embodiments, the inner sidewall may be arranged around a lower section of the one battery cell; and the multi-sided base may be a rectangular base including sidewalls, opposite each other, each formed along a respective side edge of the rectangular base. In some embodiments, the rectangular base and the sidewalls may be integrally formed as a single piece.

In some embodiments, the multi-sided base may be a rectangular base including sidewalls; each of the sidewalls may include a plurality of latches integrally formed along an inner surface of the respective sidewall and spaced apart from each other in a direction parallel to the respective side edge; and each of the plurality of latches may include a pair of projections extending from the inner surface and angled toward each other to form one part of a sliding joint. In some embodiments, each of the plurality of latches may be configured to receive a y-shaped connector of a p-group separator or an edge support structure, and the y-shaped connector may be configured to slide between respective pairs of projections to form the sliding joint.

In some embodiments, the rectangular base may further include a front wall formed along a front edge of the rectangular base, and a rear wall, opposite the front wall, formed along a rear edge of the rectangular base. In some embodiments, the rectangular base, the sidewalls, the front wall, and the rear wall may be integrally formed as the single piece.

In some embodiments, the multi-sided base may further include: a front wall including a first plurality of mounts arranged in a first pattern, the first plurality of mounts configured to attach a first component to the front wall; and a rear wall including a second plurality of mounts arranged in a second pattern, the second plurality of mounts configured to attach a second component to the rear wall. In some embodiments, the first pattern may be different from the second pattern and the first component may be different from the second component.

In some embodiments, the cell carrier may include a plastic material and may be formed by injection molding as a single piece.

In some embodiments, a battery module is provided. The battery module includes a one-piece cell carrier configured to interconnect a plurality of battery cells. The one-piece cell carrier includes: a base including a plurality of through-holes, each including an inner sidewall configured to be arranged around and hold a lower section of one of the plurality of battery cells; and one or more walls integrally formed with the base, each along a respective edge of the base.

In some embodiments, the one or more walls may include a first sidewall formed along a first edge of the base, and a second sidewall, opposite the first sidewall, formed along a second edge of the base. The first sidewall may include a first plurality of latches integrally formed along an inner surface of the first sidewall and spaced apart from each other in a direction along the first edge of the base and the second sidewall may include a second plurality of latches integrally formed along an inner surface of the second sidewall and spaced apart from each other in a direction along the second edge of the base.

In some embodiments, the battery module may further include a first edge support structure and a second edge support structure. The first edge support structure may be configured to be attached to the first plurality of latches of the first sidewall and to support first battery cells of the plurality of battery cells adjacent to the first sidewall, and the second edge support structure may be configured to be attached to the second plurality of latches of the second sidewall and to support second battery cells of the plurality of battery cells adjacent to the second sidewall.

In some embodiments, the battery module may further include a plurality of p-group separators. Each of the plurality of p-group separators may include a least one segment configured to be arranged in free space between adjacent parallel groups of the plurality of battery cells. Each of the plurality of p-group separators may further include a first connector arranged at a first end of the p-group separator and configured to be attached to a first latch and a second connector arranged at a second end of the p-group separator and configured to be attached to a second latch.

In some embodiments, the one or more walls may include a first sidewall formed along a first edge of the base, and a second sidewall, opposite the first sidewall, formed along a second edge of the base. In some embodiments, the first latch may include a first pair of projections extending from an inner surface of the first sidewall and angled to form a first part of a first sliding joint, and the second latch may include a second pair of projections extending from the inner surface of the second sidewall and to form a first part of a second sliding joint. In some embodiments, each of the first connectors may include a first y-shaped connector configured to slide between a respective first pair of projections to form the first sliding joint, and each of the second connectors may include a second y-shaped connector configured to slide between a respective second pair of projections to form the second sliding joint.

In some embodiments, the battery module may further include a busbar and an isolation bracket, and the one or more walls may further include: a third sidewall formed along a third edge of the base, the third sidewall including an isolation bracket mount; and a fourth sidewall, opposite the third sidewall, formed along a fourth edge of the base, the fourth sidewall including a busbar mount. In some embodiments, the isolation bracket may be mounted to the isolation bracket mount and the busbar may be mounted to the busbar mount.

In some embodiments, the battery module may further include a thermistor. In some embodiments, the third sidewall may include a thermistor pocket integrally formed therein, and the thermistor may be mounted in the thermistor pocket.

In some embodiments, the battery module may further include the plurality of battery cells. In some embodiments, each of the plurality of battery cells may include a cylindrical sidewall, and each of the inner sidewalls may include a cylindrical inner sidewall corresponding to the cylindrical sidewalls of the plurality of battery cells.

In some embodiments, the battery module may further include a cooling plate, and the cooling plate may be attached to a bottom surface of each of the plurality of battery cells.

In some embodiments, the one-piece cell carrier may include a plastic material and may be formed by injection molding as one piece.

In some embodiments, a method of assembling a battery module is provided. The method includes providing a one-piece cell carrier, a plurality of battery cells, and an adhesive. The one-piece cell carrier includes a rectangular base including a first side, a second side opposite the first side and a plurality of through-holes arranged in a predetermined pattern, each through-hole extending from the first side to the second side and having an inner sidewall configured to be arranged around and hold a lower section of one of the plurality of battery cells. The method further includes inserting each of the plurality of battery cells into a respective through-hole such that a top end of each of the plurality of battery cells extends from the first side and a bottom end of each of the plurality of battery cells extends from the second side; selectively applying adhesive to at least one of the plurality of batteries and the rectangular base such that the adhesive binds each inner sidewall to a respective lower section of one of the plurality of batteries; and curing the adhesive.

In some embodiments, the one-piece cell carrier may further include a first sidewall integrally formed with the rectangular base along a first edge of the rectangular base and a second sidewall, opposite the first sidewall, integrally formed with the rectangular base along a second edge of the rectangular base. In some embodiments, the method may further include providing a first edge support structure configured to support battery cells along the first edge and a second edge support structure configured to support battery cells along the second edge, and before inserting each of the plurality of battery cells in a respective through-hole, attaching the first edge support structure to an inner side of the first sidewall, and attaching the second edge support structure to an inner side of the second sidewall.

In some embodiments, the method may further include providing a plurality of p-group separators, each including at least one segment configured to be disposed in free space between adjacent parallel groups of battery cells. In some embodiments, the method may further include, after attaching the first edge support structure and the second edge support structure and before inserting each of the plurality of battery cells in a respective through-hole, attaching a first end of each of the plurality of p-group separators to the inner side of the first sidewall, and attaching a second end, opposite to the first end, of each of the plurality of p-group separators to the inner side of the second sidewall.

In some embodiments, the method may further include providing a cooling plate, and attaching, after inserting each of the plurality of battery cells in a respective through-hole, the cooling plate to lower ends of each of the plurality of battery cells.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 3A shows a top view of the cell carrier of FIG. 2, in accordance with some embodiments of the present disclosure;

FIG. 3B shows an elevation view of the outside surface of the front wall of the cell carrier of FIG. 2, in accordance with some embodiments of the present disclosure;

FIG. 3C shows an elevation view of the outside surface of the rear wall of the cell carrier of FIG. 2, in accordance with some embodiments of the present disclosure;

DETAILED DESCRIPTION

Figure 1:
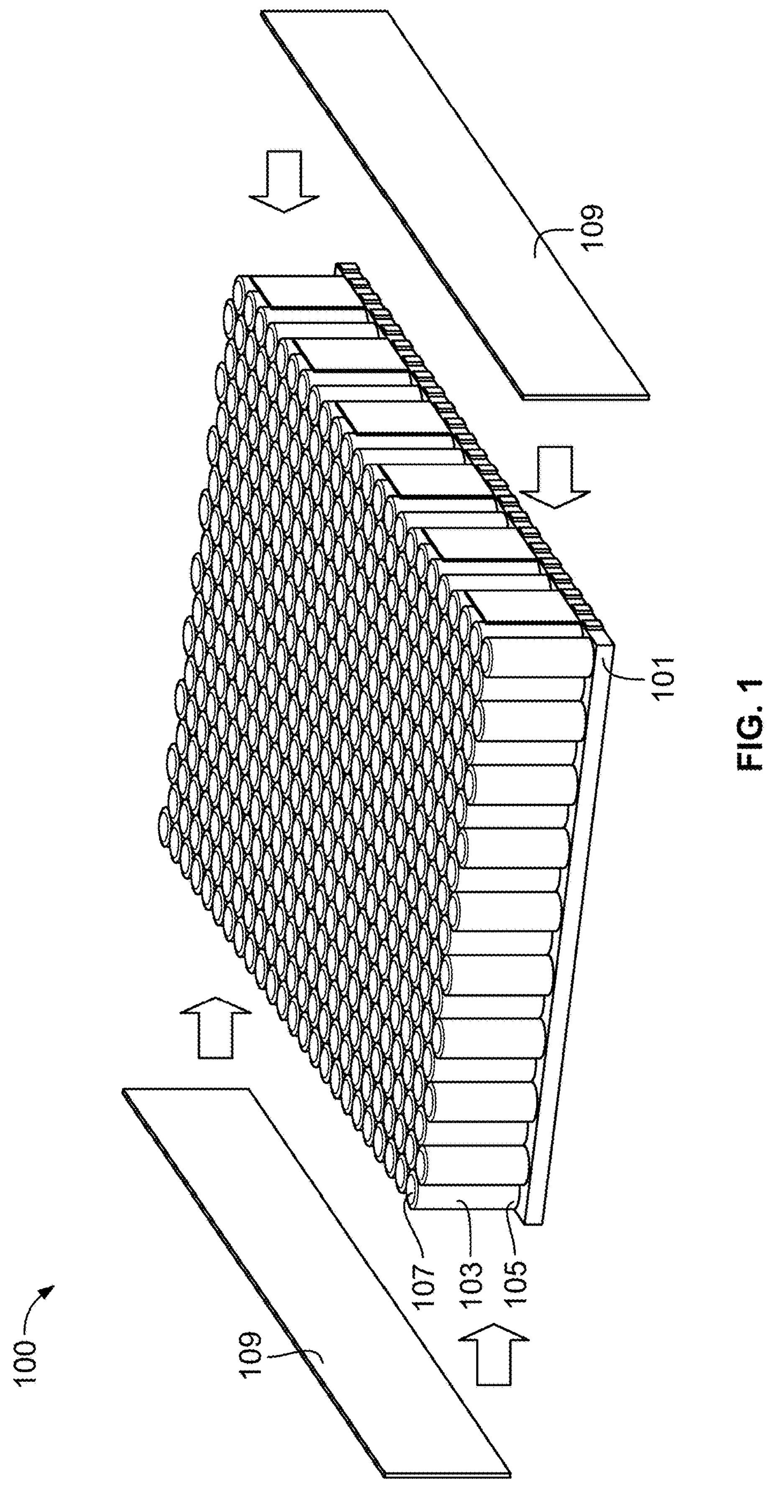
FIG. 1 shows an example of a battery module.

In one approach, as shown in FIG. 1, a first end 105 of each of a plurality of battery cells 103 may be inserted into and coupled to a respective recess on a first side of a carrier layer 101 of a battery module 100. The first end 105 (e.g., an upper end) may include a first electrical terminal (e.g., a center button terminal), while a second end 107 (e.g., a lower end) of each of the plurality of battery cells 103 may include a second electrical terminal. The second electrical terminal may be formed by the second end 107, a side of each battery cell 103, and a portion of the first end 105. After the plurality of battery cells 103 are coupled to the carrier layer 101, sidewalls 109 may be attached to two sides of the battery module 100 (e.g., using an adhesive). Additional sidewalls (not shown) may also be attached to the remaining sides of the battery module 100 (e.g., also using an adhesive). A current collector assembly including at least one bus bar may be coupled to a second side of the carrier layer 101 and selectively connected to the plurality of battery cells 103. However, in some embodiments, it would be advantageous to reduce the number of parts required in the assembly of a battery module, in order to, e.g., simplify assembly.

FIGS. 2-14B show a cell carrier, components of a battery module and a series of steps in a process of assembling a battery module including the cell carrier, such as the battery module of FIGS. 9, 11, 12, 13, 14A, and 14B, in accordance with some embodiments of the present disclosure.

Figure 2:
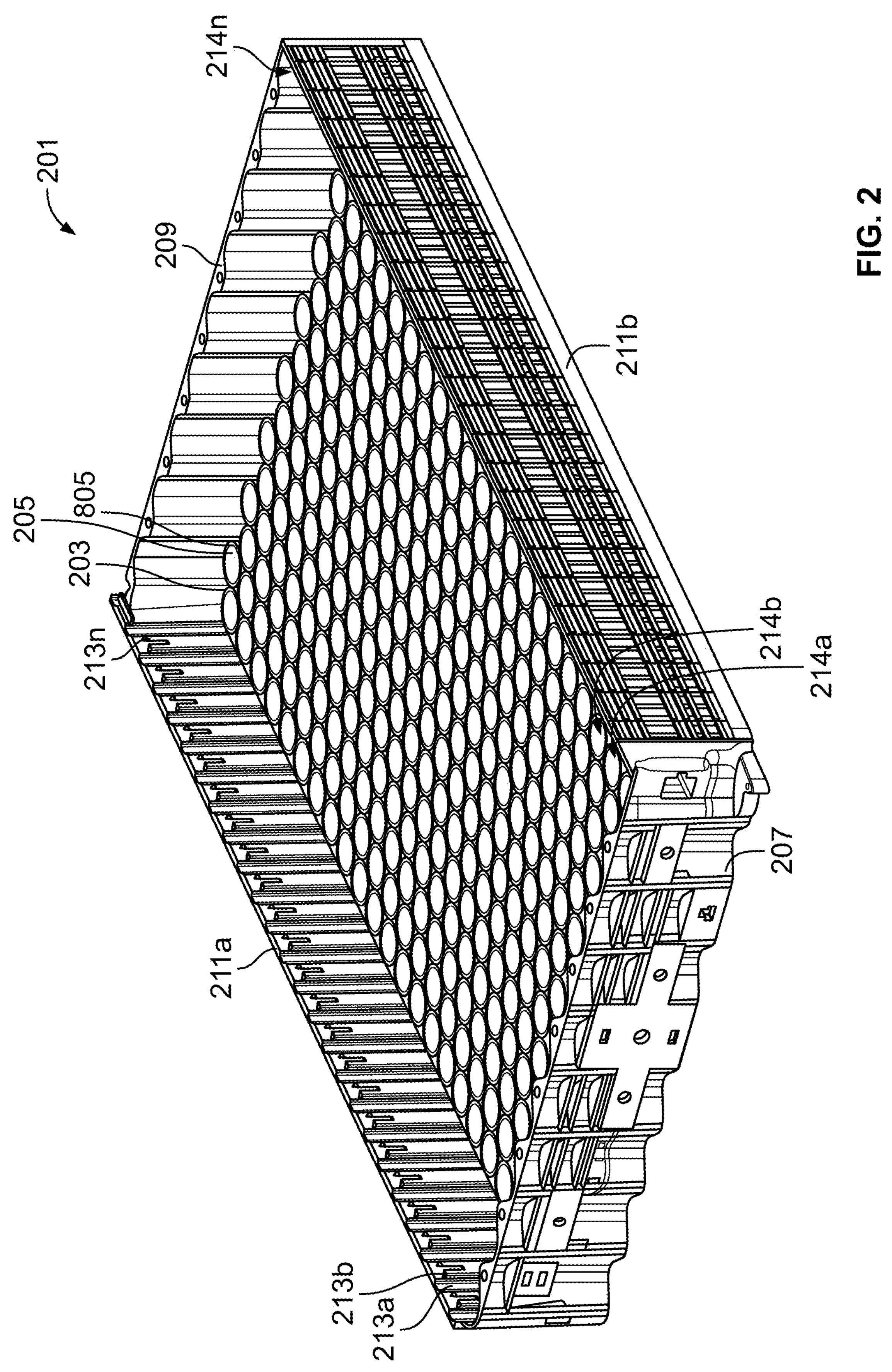
FIG. 2 shows a perspective view of a cell carrier of a battery module assembly, in accordance with some embodiments of the present disclosure.

FIG. 2 shows a perspective view of a cell carrier 201 of a battery module assembly, in accordance with some embodiments of the present disclosure. As shown, the cell carrier 201 includes a base 203 (e.g., a multi-sided base) having a plurality of through-holes 205 extending from a top side of the base 203 to a bottom side of the base 203. As explained in further detail below, each of the through-holes 205 comprises an inner sidewall 805 configured to be arranged around and hold a lower section of a battery cell (e.g., to interconnect a plurality of battery cells).

As shown, the cell carrier 201 further includes a front wall 207 (e.g., a third sidewall) formed along a front edge of the base 203; a rear wall 209 (e.g., a fourth sidewall), opposite the front wall 207, formed along a rear edge of the base 203; and first and second sidewalls 211*a* and 211*b*, opposite each other, formed along respective side edges of the base 203 (e.g., a five-sided tote). Although the language "front wall" and "rear wall" is used herein, it should be understood that the battery module may not have a front or a rear side. The cell carrier 201 may be formed as a single piece. That is, the front wall 207, the rear wall 209, and the first and second sidewalls 211*a* and 211*b* may be integrally formed with the base 203 (e.g., by injection molding, three-dimensional printing, or any other suitable manufacturing method). In some embodiments, the cell carrier 201 may be formed from plastic materials, from a composite material including plastic, any other suitable material, or any combination thereof. As shown, the base 203 may be substantially rectangular (e.g., a rectangular base). As used herein, "rectangular" includes shapes having four sides of equal length. However, this is only one example, and the base 203 may be any suitable multi-sided shape (e.g., triangular, hexagonal, heptagonal, circle, etc.) depending on the requirements of the battery module. Any one or a combination of the first and second sidewalls 211*a* and 211*b*, the front wall 207, and the rear wall 209 may be referred to herein as one or more walls or one or more sidewalls.

As shown, the first sidewall 211*a* may include a first plurality of latches 213*a*, 213*b* . . . 213*n* (collectively referred to as first latches 213) spaced apart from each other along the inner surface of the first sidewall 211*a* (e.g., along the lengthwise direction of the first sidewall 211*a*). The second sidewall 211*b* may also include a second plurality of latches 214*a*, 214*b* . . . 214*n* (collectively referred to as second latches 214) spaced apart from each other along the inner surface of the second sidewall 211*b* (e.g., along the lengthwise direction of the second sidewall 211*b*). In some embodiments, the spacing between adjacent ones of the latches (213, 214) along each sidewall (211*a*, 211*b*) may correspond to the spacing and size of the through-holes 205 along each sidewall (211*a*, 211*b*). That is, as shown, a latch (213, 214) may be centered between each pair of through-holes 205. However, this is only an example, and the number of latches (213, 214) along each sidewall may be reduced based on the requirements of the battery module (e.g., a latch may be arranged between every other pair of through-holes or only between parallel groups of battery cells). Additional details of the cell carrier 201 are described below with reference to, e.g., FIGS. 3A, 3B, and 3C.

Figure 3A:
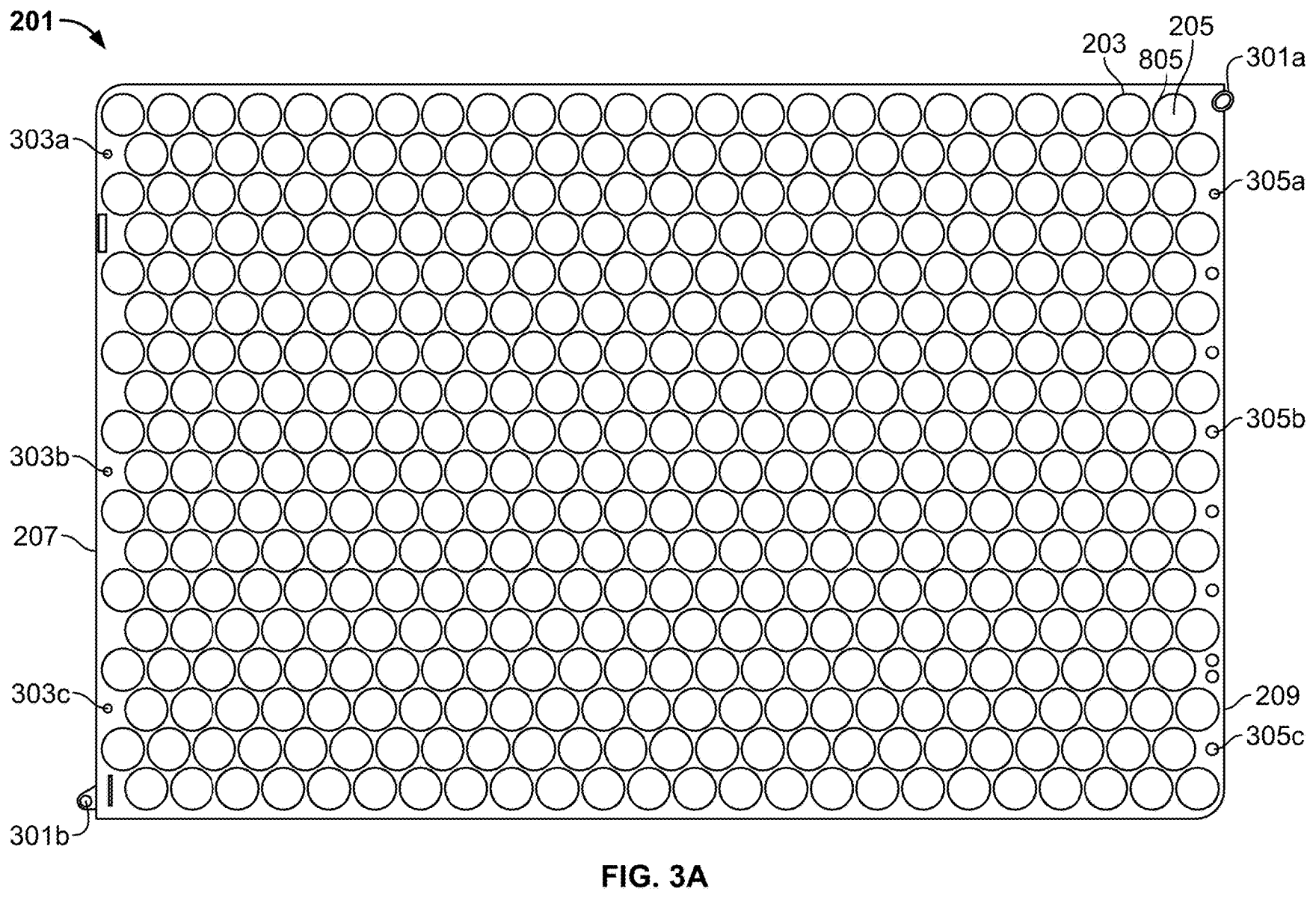

FIG. 3A shows a top view of the cell carrier 201 of FIG. 2, in accordance with some embodiments of the present disclosure. As shown, each of the plurality of through-holes 205 in the base 203 may be circular (e.g., including a cylindrically shaped inner sidewall 805 corresponding to the cylindrical sidewalls of battery cells to be inserted into each of the plurality of through-holes 205) and may be arranged in a close-hex-pack configuration (e.g., a predetermined pattern) as illustrated. However, it should be understood that the shape and arrangement of the through-holes 205 may be modified to be any suitable shape and arrangement based on the shape and arrangement of the battery cells to be inserted into the through-holes 205.

In some embodiments, the cell carrier 201 may include locating holes 301*a* and 301*b* for aligning the cell carrier 201 with other components of the battery module, such as a cold plate and a second cell carrier, as explained in further detail below. In some embodiments, the cell carrier 201 may also include locating holes 303*a*, 303*b*, and 303*c* on a top side of the front wall 207 for aligning a first end of a current collector assembly (e.g., including at least one busbar connecting battery cells of the battery module). In some embodiments, the cell carrier 201 may also include locating slots 305*a*, 305*b*, and 305*c* on a top side of the rear wall 209 for aligning a second end of the current collector assembly. In some embodiments, locating holes 303 and 305 may be used for aligning any suitable components to be mounted to the battery module.

FIG. 3B shows an elevation view of the outside surface of front wall 207 of the cell carrier 201 of FIG. 2, in accordance with some embodiments of the present disclosure. FIG. 3C shows an elevation view of the outside surface of rear wall 209 of the cell carrier 201 of FIG. 2, in accordance with some embodiments of the present disclosure. In some embodiments, the front wall 207 may be identical to the rear wall 209. However, in some embodiments, if different components are to be mounted on the front wall 207 and the rear wall 209 (e.g., as discussed in further detail below with reference to FIGS. 14A and 14B), it may be advantageous for the front wall 207 and the rear wall 209 to be individually configured to mount respective components. For example, as shown in FIG. 3B, the front wall 207 may include pocket 307 configured to attach a thermistor (e.g., thermistor 1401 of FIG. 14A) to the battery module; front busbar mounts 309*a* and 309*b* configured to attach at least one busbar (e.g., busbar 1403*a* or busbar 1403*b* of FIG. 14A) to the battery module; and isolation bracket mounts 311*a*, 311*b*, 311*c*, 311*d*, 311*e*, and 311*f* configured to attach an isolation bracket (e.g., isolation bracket 1405 of FIG. 14A) to the battery module. As shown, the pocket 307, the front busbar mounts 309*a* and 309*b*, and the isolation bracket mounts 311*a*, 311*b*, 311*c*, 311*d*, 311*e*, and 311*f* may be arranged in a pattern (e.g., a first pattern). As shown in FIG. 3C, the rear wall 209 may only include rear busbar mounts 309*c* and 309*d* (e.g., arranged in a second pattern) configured to attach a serial busbar (e.g., serial busbar 1407 of FIG. 14B) to the battery module. However, these are merely examples, and each of the front wall 207 and the rear wall 209 may be configured with any suitable arrangement or number of mounting features, depending on the requirements of the battery module. Any one or a combination of the pocket 307, the front busbar mounts 309*a* and 309*b*, and the isolation bracket mounts 311*a*, 311*b*, 311*c*, 311*d*, 311*e*, and 311*f* may be referred to herein a first plurality of mounts. Any one or a combination of the rear busbar mounts 309*a* and 309*d* may be referred to herein as a second plurality of mounts.

Figure 4:
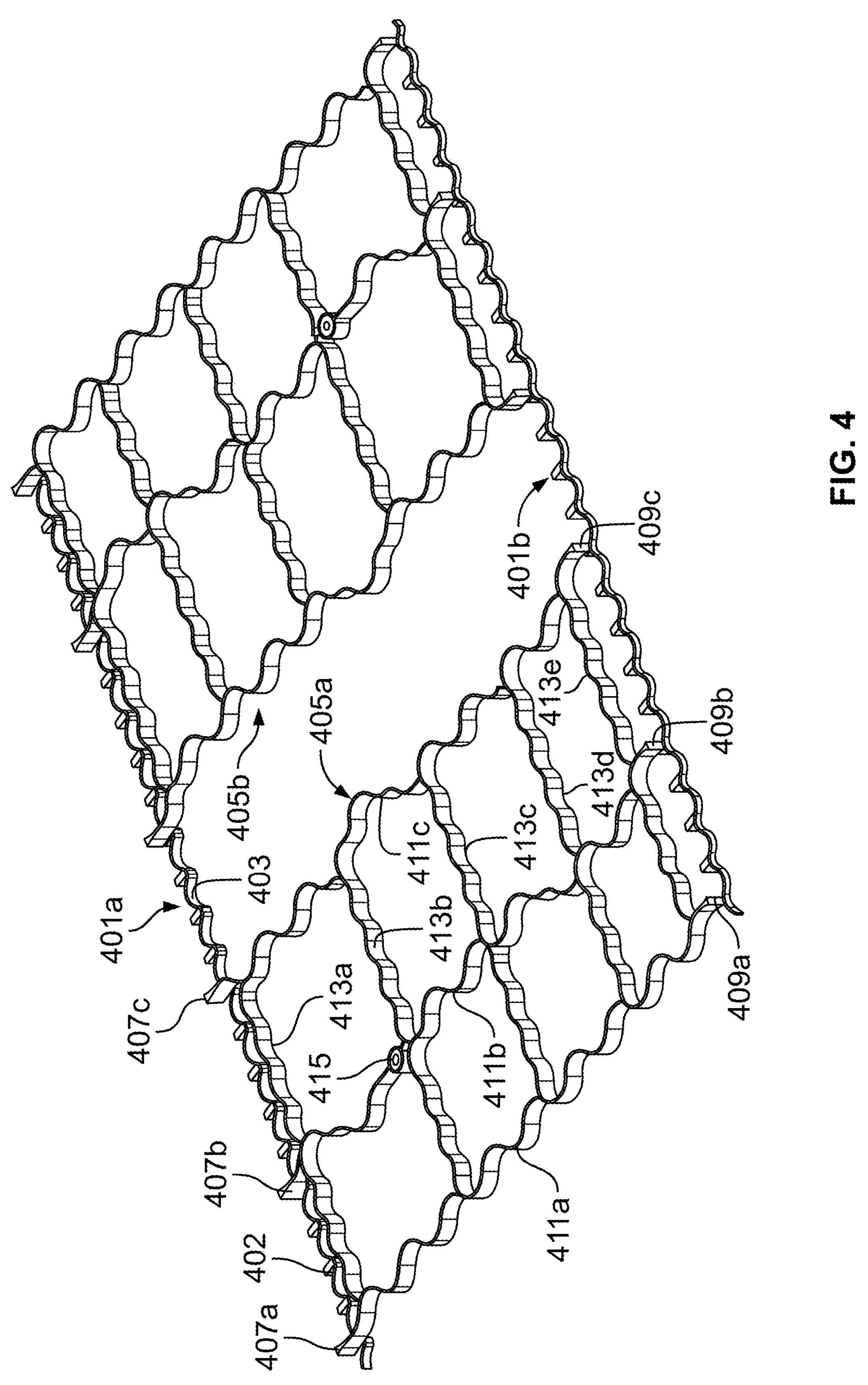
FIG. 4 shows a perspective view of first and second edge support structures and first and second p-group separators of a battery module assembly, in accordance with some embodiments of the present disclosure.

FIG. 4 shows a perspective view of first and second edge support structures 401*a* and 401*b* and first and second p-group separators 405*a* and 405*b* (e.g., a plurality of p-group separators) of a battery module assembly, in accordance with some embodiments of the present disclosure. As explained in further detail below with reference to FIG. 11, each of the first and second edge support structures 401*a* and 401*b* include a plurality of battery support segments 403 configured to support battery cells arranged along edges of the battery module. For example, shown in greater detail in, e.g., FIGS. 5, 6, 8, and 11, the first edge support structure 401*a* may be configured to be attached to the latches 213 of the first sidewall 211*a* and support battery cells adjacent to the first sidewall 211*a*, while the second edge support structure 401*b* may be configured to be attached to the latches 214 of the second sidewall 211*b* and support battery cells adjacent to the second sidewall 211*b*.

The first and second p-group separators 405*a* and 405*b* (e.g., isolators) may also be configured to be attached to certain ones of the latches 213 and 214. The first and second p-group separators 405*a* and 405*b* may provide additional support for battery cells in the battery module and to separate different parallel groups of battery cells from each other (e.g., at different operating voltages from each other), as explained in further detail with reference to FIG. 11. As shown, the first p-group separator 405*a* may include a first plurality of y-shaped connectors 407*a*, 407*b*, and 407*c* (collectively referred to as first y-shaped connectors 407) arranged on a first end and a second plurality of y-shaped connectors 409*a*, 409*b*, and 409*c* (collectively referred to as second y-shaped connectors 409) arranged on a second end opposite the first end. As explained in further detail below, the first and second y-shaped connectors 407 and 409 (e.g., having a flared y design) are configured to be attached to latches among the first and second latches 213 and 214. The first p-group separator 405*a* further includes a first plurality of segments 411*a*, 411*b*, and 411*c* (collectively referred to as first segments 411) extending from the first end to the second end of the first p-group separator 405*a* and a second plurality of segments 413*a*, 413*b*, 413*c*, 413*d*, and 413*e* (collectively referred to as second segments 413) extending in a direction substantially perpendicular to the first segments 411 and connecting the first segments 411 to each other (e.g. ladder p-group separators). In some embodiments, the first p-group separator 405*a* may include a locating projection 415*a* for aligning other components to be mounted to the battery module (e.g., a current collector assembly).

Figure 12:
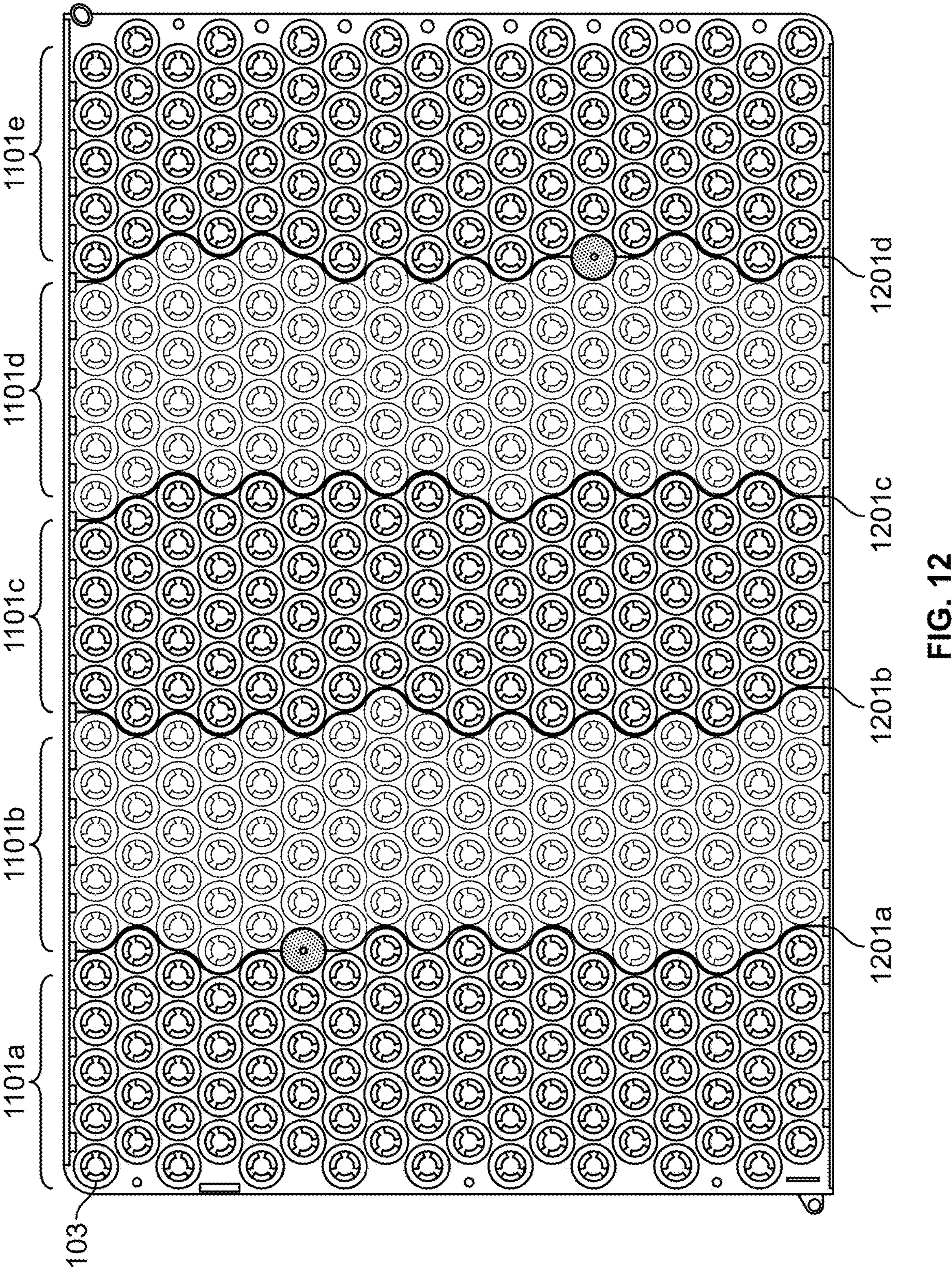
FIG. 12 shows a top view of the battery module assembly of FIG. 5, following the insertion of wavy p-group separators and a plurality of battery cells, in accordance with some embodiments of the present disclosure.

In some embodiments, certain ones of the first and second segments 411 and 413 may be omitted, depending on the requirements of the battery module. For example, FIG. 12 shows an embodiment that includes only segments between parallel groups of battery cells. Additionally, p-group separators may have other configurations (e.g., such as the hexagonal p-group separators illustrated in FIG. 7). In some embodiments, the second p-group separator 405*b* may be identical to the first p-group separator. However, in some embodiments, the second p-group separator 405*b* may be attached to the battery module in a different orientation from the first p-group separator 405*a*. For example, as shown, the second p-group separator 405*b* may be rotated 180 degrees relative to the first p-group separator 405*a* such that the first end of the first p-group separator 405*a* is arranged on the same side as the second end of the second p-group separator 405*b*.

The first and second p-group separators 405*a* and 405*b* (as well any of the other p-group separators described below) may comprise a stiff material that provides additional support to the battery module. For example, the first and second p-group separators 405*a* and 405*b* may be a plastic material (e.g., formed by injection molding), a meta-aramid fiber material (e.g., NOMEX®), or any other suitable material.

Figure 5:
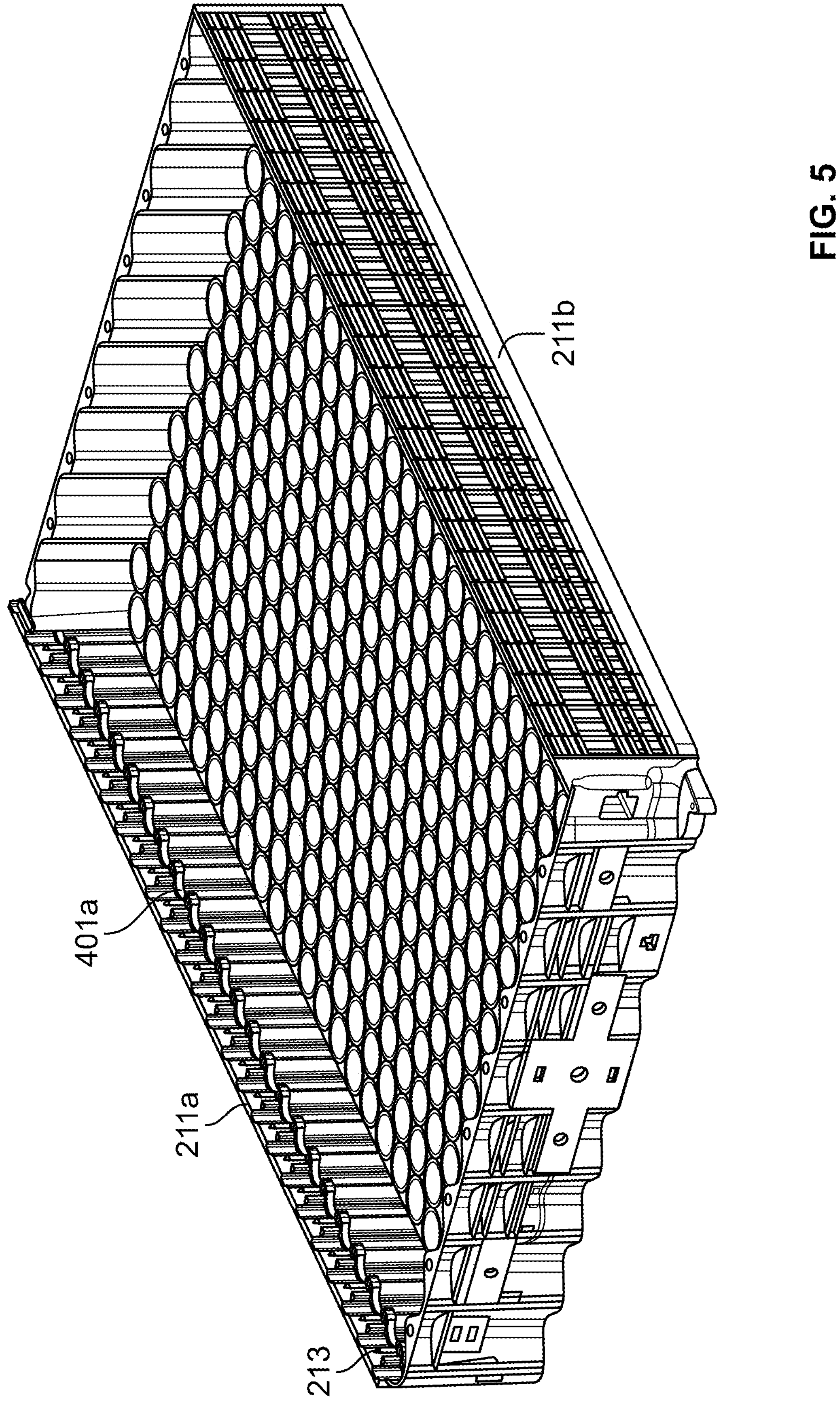
FIG. 5 shows a perspective view of the battery module assembly of FIG. 2, following the insertion of the edge support structures of FIG. 4, in accordance with some embodiments of the present disclosure.

FIG. 5 shows a perspective view of the battery module assembly of FIG. 2, following the insertion of the edge support structures 401*a* and 401*b* of FIG. 4, in accordance with some embodiments of the present disclosure. As shown, the edge support structure 401*a* may be connected (e.g., slidably connected) to the latches 213 on the inner surface of the first sidewall 211*a*, as shown in greater detail with reference to FIG. 8. Similarly, the edge support structure 401*b* may be connected (e.g., slidably connected) to the latches 214 on the inner surface of the second sidewall 211*b*.

Figure 6:
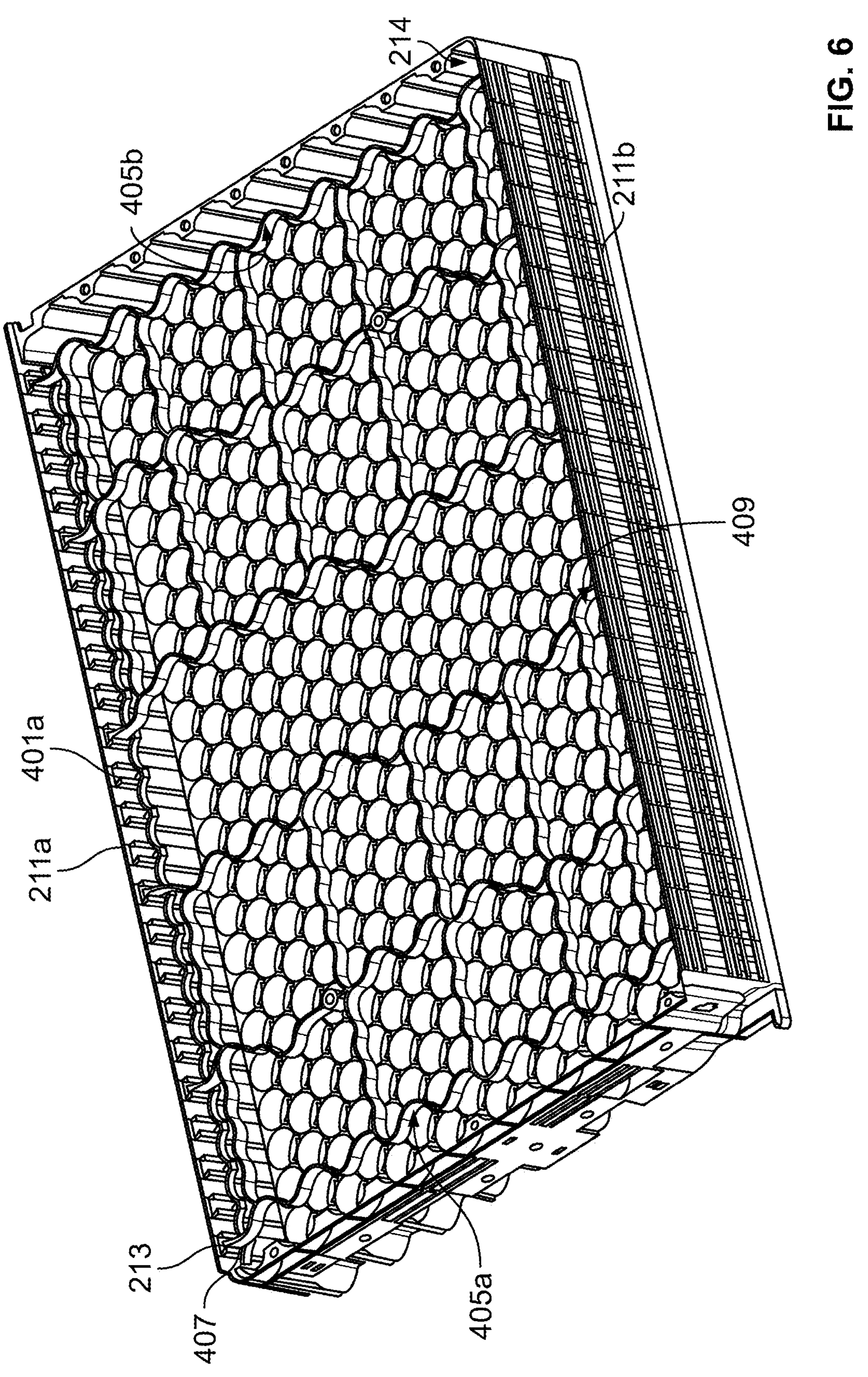
FIG. 6 shows a perspective view of the battery module assembly of FIG. 5, following the insertion of the ladder p-group separators of FIG. 4, in accordance with some embodiments of the present disclosure.

FIG. 6 shows a perspective view of the battery module assembly of FIG. 5, following the insertion of the p-group separators 405*a* and 405*b* of FIG. 4, in accordance with some embodiments of the present disclosure. As shown, the first y-shaped connectors 407 (e.g., on a first end) of the first p-group separator 405*a* may be connected (e.g., slidably connected) to certain latches among the latches 213 of the first sidewall 211*a*, while the second y-shaped connectors 409 (e.g., on a second end opposite to the first end) of the first p-group separator 405*b* may be connected (e.g., slidably connected) to certain latches among the latches 214 of the second sidewall 211*b*. As shown, the second p-group separator 405*b* may be connected in an opposite orientation from the first p-group separator 405*a*. For example, a second end of the second-p group separator 405*b* may be connected to certain latches among the latches 213 of the first sidewall 211*a*, while a first end of the second p-group separator 405*b* may be connected to certain latches among the latches 214 of the second sidewall 211*b*. However, this is only an example, and the first and second p-group separators 405*a* and 405*b* may also be connected in the same orientation depending on the configuration of the battery module.

Figure 7:
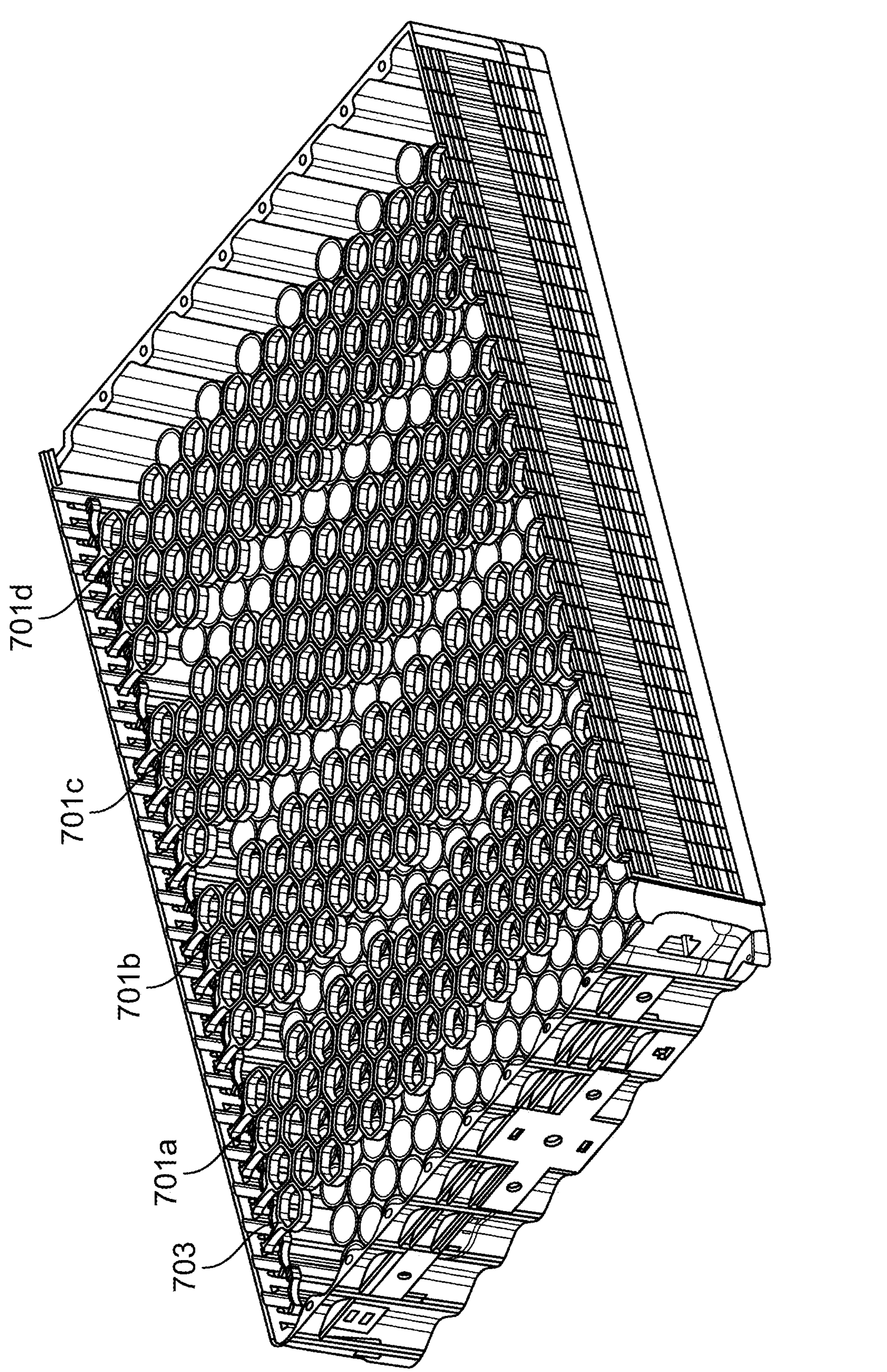
FIG. 7 shows a perspective view of the battery module assembly of FIG. 5, following the insertion of hexagonal p-group separators, in accordance with some embodiments of the present disclosure.

FIG. 7 shows a perspective view of the battery module assembly of FIG. 5, following the insertion of hexagonal p-group separators 701*a*, 701*b*, 701*c*, and 701*d*, in accordance with some embodiments of the present disclosure. The p-group separators 701*a*, 701*b*, 701*c*, and 701*d* (collectively referred to as p-group separators 701) may be used in place of one or more of the p-group separators 405*a* and 405*b* of FIG. 6, depending on the requirements of the battery module. As shown, each of the p-group separators 701 includes a plurality of hexagonal cells 703 arranged in a pattern corresponding to the arrangement of the plurality of through-holes 205, as discussed above with reference to FIG. 3A. That is, the hexagonal cells 703 may form one or more honeycomb structures corresponding to the arrangement of the plurality of battery cells or groups of the plurality of battery cells.

Figure 8:
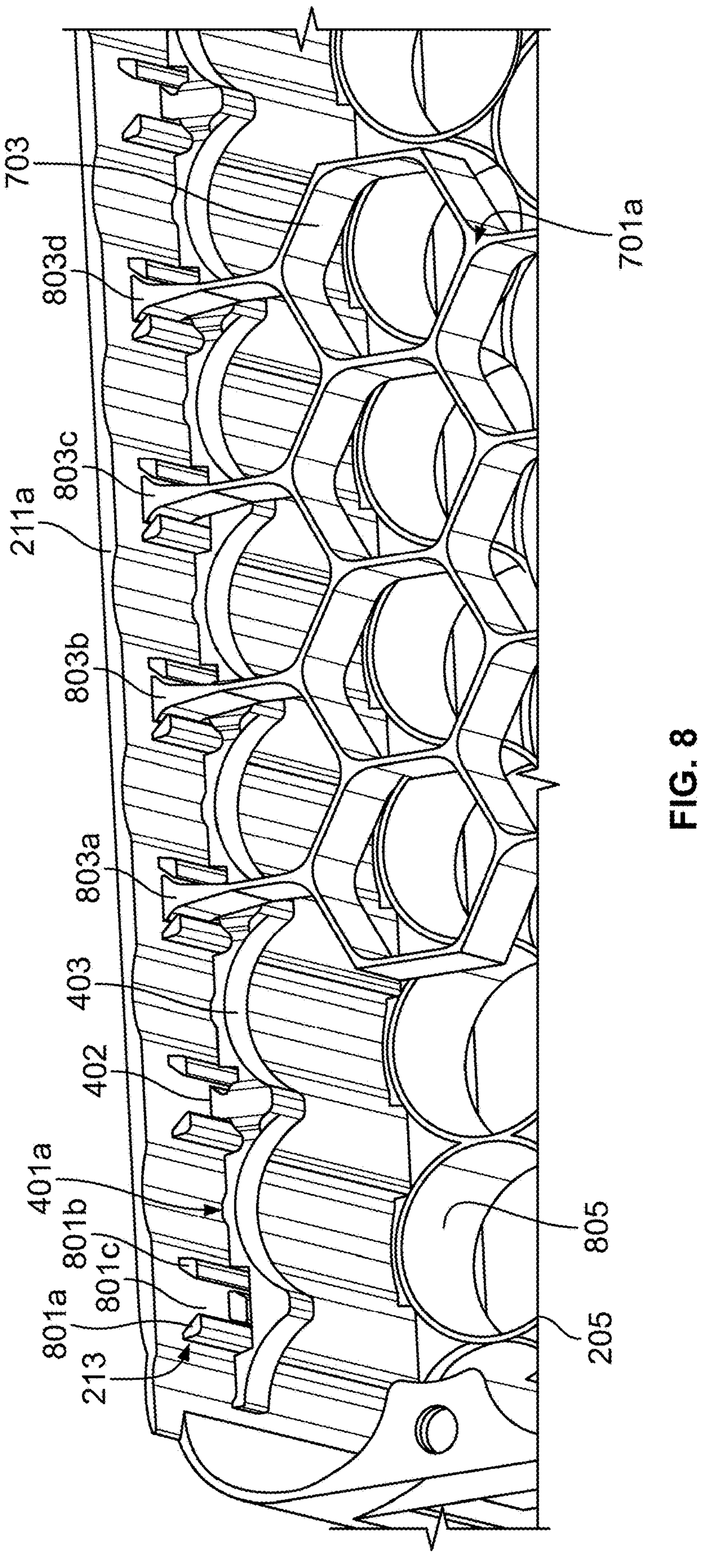
FIG. 8 shows a partial view of the battery module assembly of FIG. 7, in accordance with some embodiments of the present disclosure.

FIG. 8 shows a partial view of the battery module assembly of FIG. 7, in accordance with some embodiments of the present disclosure. In particular, FIG. 8 shows an example of the configuration of the latches 213 and how the first edge support structure 401*a* and the first hexagonal p-group separator 701*a* are connected to the latches 213. As shown, each of the latches 213 may include a pair of projections (e.g., first projection 801*a* and second projection 801*b*) that extend from the inner surface of the first sidewall 211*a*. The first and second projections 801*a* and 801*b* may be angled toward each other and to form a trapezoidal space 801*c* between the first and second projections 801*a* and 801*b*. The height of the trapezoidal space 801*c* may be high enough to accommodate both the first edge support structure 401*a* and the first hexagonal p-group separator.

As shown, the first edge support structure 401*a* includes a plurality of y-shaped connectors 402 that correspond to the trapezoidal space 801*c* of each of the latches 213. When the y-shaped connectors 402 are inserted into the trapezoidal space 801*c* of each of the latches 213 (e.g., from a top side of the latches 213), the latches 213 may hold the first edge support structure 401*a* in place. That is, the y-shaped connectors 402 may be slidably connected to each of the latches 213 to form a sliding joint (e.g., a sliding dovetail joint). In some embodiments, the first edge support structure 401*a* may include a y-shaped connector 402 for each of the latches 213. In other embodiments, certain ones of the y-shaped connectors 402 may be omitted. For example, as shown, an end portion the first edge support structure 401*a* may not include a y-shaped connector 402. As shown, the battery support segments 403 may correspond to the shape of the sidewall of a cylindrical battery cell. The second edge support structure 401*b* may be configured in the same manner as the first edge support structure 401*a*. Although a y-space is illustrated, it should be understood that the projections may form any suitable space that locks the components into place (e.g., a sliding joint) during assembly of the battery module.

The first hexagonal p-group separator 701*a* also includes a plurality of y-shaped connectors 803*a*, 803*b*, 803*c*, and 803*d* (collectively referred to y-shaped connectors 803) at a first end. The first hexagonal p-group separator 701*a* also includes the same y-shaped connectors at a second end, opposite the first end. As shown, the shape of the y-shaped connectors 803 also corresponds to the trapezoidal space 801*c* of each of the latches 213 such that when the y-shaped connectors 803 are inserted into the latches 213 (i.e., from a top side of the latches 213), the latches 213 may hold the first hexagonal p-group separator 701*a* in place. As shown, the first hexagonal p-group separator 701*a* may be inserted into the latches 213 after the first edge support structure 401*a* and may rest on a top surface of the first edge support structure 401*a*. However, this is only one example, and the first hexagonal p-group separator 701*a* may be inserted before the first edge support structure 401*a*, depending on the requirements of the battery module. In one embodiment, the first edge support structure 401*a* may be integrated into the first sidewall 211*a*.

Although only the first edge support structure 401*a* and the first hexagonal p-group separator 701*a* are shown, it should be understood that the second edge support structure 401*b* and other ones of the p-group separators (e.g., 701*b*, 701*c*, and 701*d*) may be inserted in a similar manner. Additionally, it should be understood that the p group separators 405*a* and 405*b* of FIG. 6 may be connected to the latches 213 (and the latches 214) in a similar manner. In some embodiments, although the y-shaped connectors 402 and 803 are shown as the male portions of a sliding joint while the latches 213 are shown as the female portions of the sliding joint, it should be understood that the portions may be oppositely configured. In some embodiments, after battery cells are inserted into the battery module, the sliding joints may be permanently bonded by an adhesive.

Figure 9:
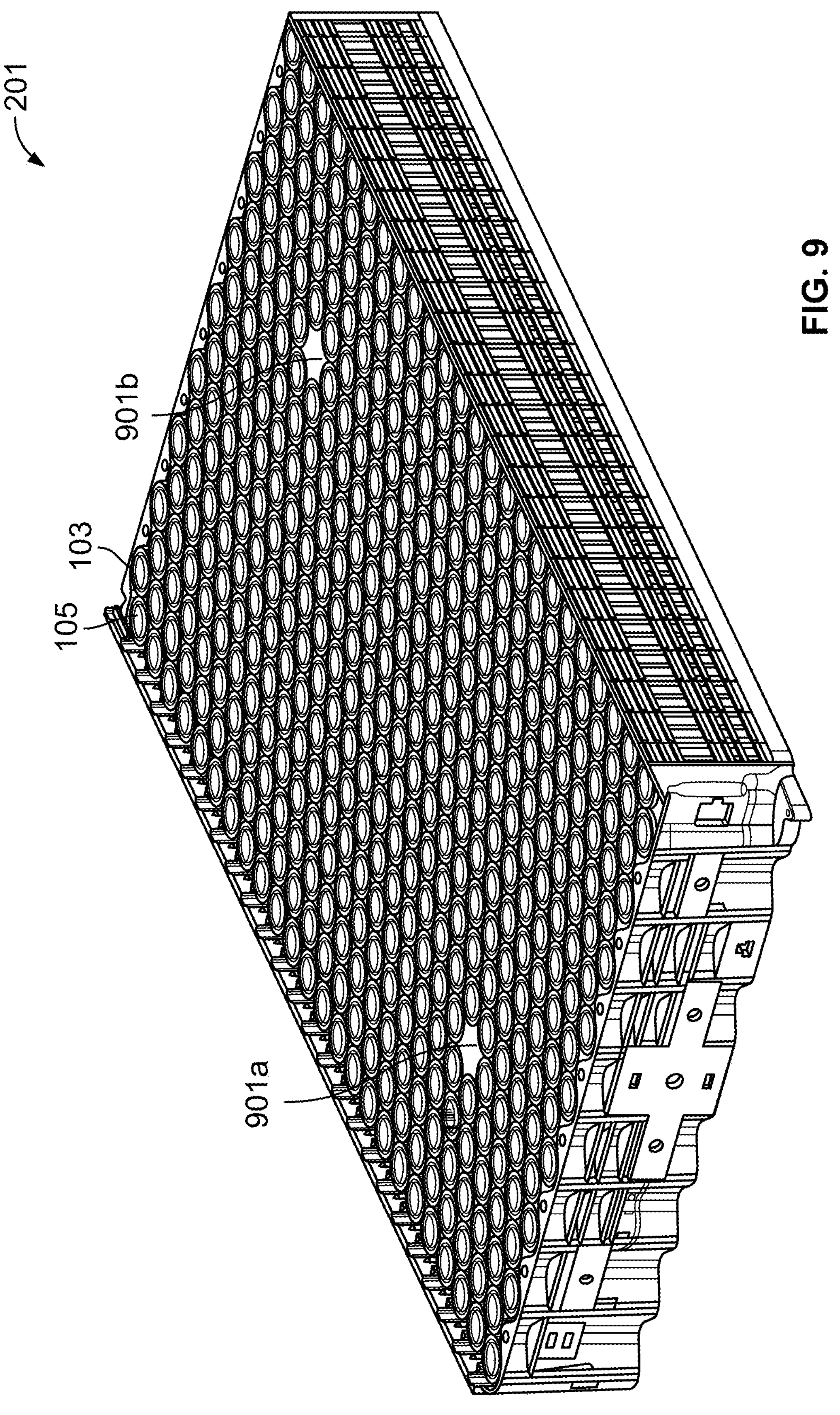
FIG. 9 shows a perspective view of the battery module assembly of either of FIGS. 6 and 7, following the insertion of a plurality of battery cells, in accordance with some embodiments of the present disclosure.
Figure 10:
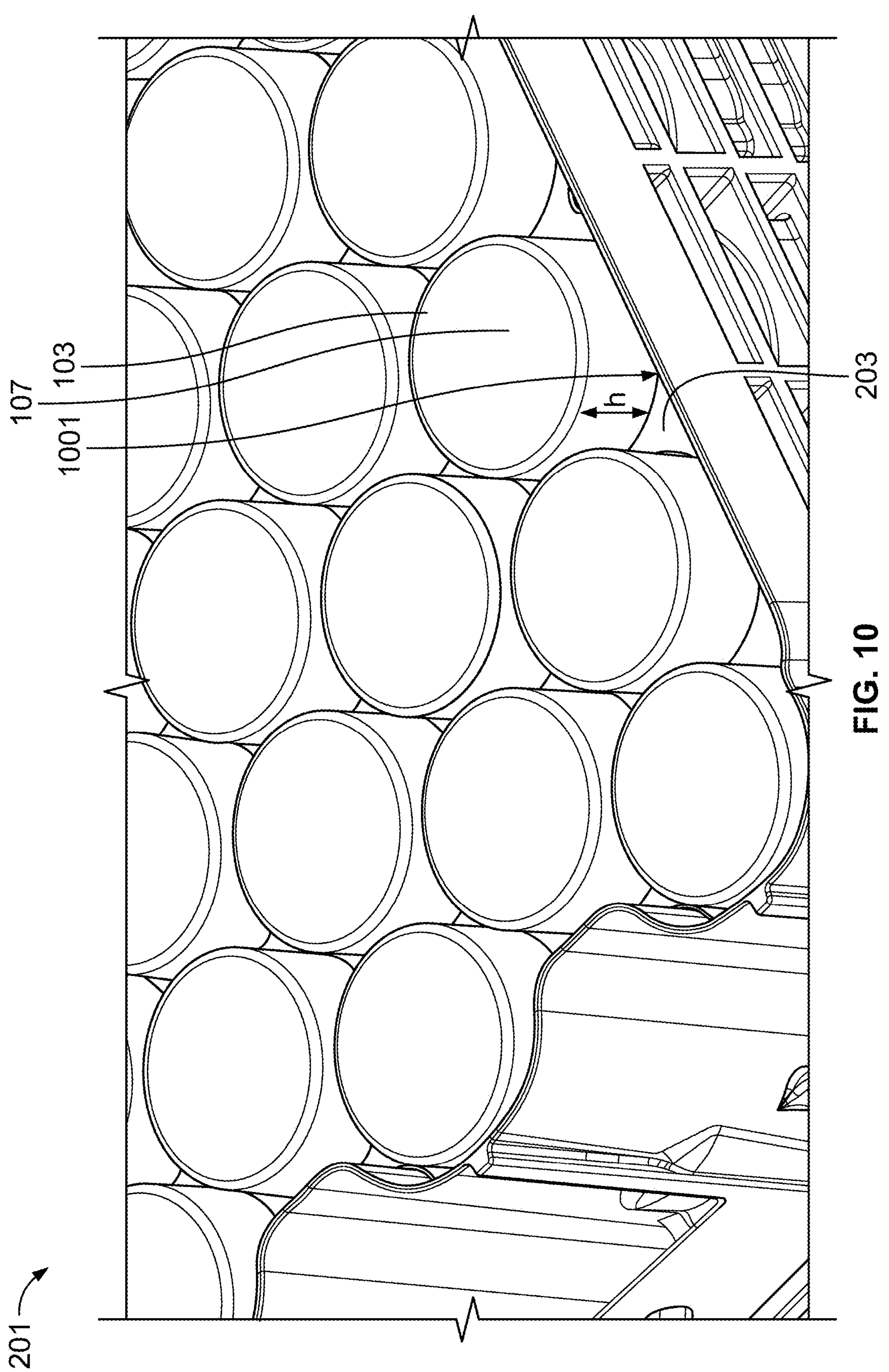
FIG. 10 shows a partial perspective view of a bottom side of the battery module of FIG. 9, in accordance with some embodiments of the present disclosure.

After the edge support structures 401 and the hexagonal p-group separators 701 are inserted into the cell carrier 201, a lower section of each of a plurality of battery cells (e.g., battery cells 103) may be inserted into each of the through-holes 205, as shown in FIGS. 9 and 10. An inner sidewall 805 of each of the through-holes 205 corresponds to the shape of each of the battery cells (e.g., cylindrical) such that each inner sidewall 805 is arranged around and holds a lower section of a battery cell.

FIG. 9 shows a perspective view of the battery module assembly of either of FIGS. 6 and 7, following the insertion of a plurality of battery cells 103, in accordance with some embodiments of the present disclosure. As described above, each of the plurality of battery cells 103 may have a first end 105 including a first electrical terminal (e.g., a center button terminal) and a second end 107 including a second electrical terminal (e.g., a rim terminal). Each of the plurality of battery cells 103 may also include one or more vents near the first end 105. After the plurality of battery cells 103 is inserted in the cell carrier 201, an adhesive may be applied to an area where the battery cells 103 intersect the through-holes 205 (e.g., to a sidewall of each of the battery cells 103 and a top surface of the base 203 around each of the through-holes 205). The adhesive may be a wicking or self-wicking adhesive that flows to the area between the inner sidewall 805 of each of the through-holes 205 and a sidewall of a respective battery cell 103 (e.g., by the capillary effect) before curing. In some embodiments, the adhesive is a quick-dry (e.g., three-minute) adhesive. The adhesive may also be applied to latches 213 and 214 and the edge support structures 401 and the p-group separators 405 (or the hexagonal p-group separators 701) to secure the edge support structure 401 and the p-group separators 405 or the hexagonal p-group separators 701) to the cell carrier 201. Because the adhesive is applied to the components of the battery module after the edge support structures 401, the p-group separators 405 (or the hexagonal p-group separator 701), and the plurality of battery cells 103 are arranged in the cell carrier 201, tolerance requirements for the battery module may be relaxed, and assembly of the battery module may be improved. Additionally, because venting portions of each of the battery cells 103 are not encased by the through-holes 205, venting of battery cells 103 may be improved (e.g., during thermal events). In some embodiments, depending on the requirement of the battery module (e.g., battery cell count), battery cells 103 may be omitted from certain battery cell locations (e.g., 901*a* and 901*b*).

FIG. 10 shows a partial perspective view of a bottom side of the battery module of FIG. 9, in accordance with some embodiments of the present disclosure. As shown, the second end 107 of each of the plurality of battery cells 103 may extend from a bottom surface of the base 203 by a distance (e.g., distance "h") that allows the second end 107 of each of the plurality of battery cells 103 to be attached to a cooling plate, as explained in further detail below. That is, the inner surface (e.g., the inner surface 805 illustrated in FIG. 8) of each of the through-holes 205 is arranged around a lower section 1001 (e.g., on a half of the battery cell 103 opposite the end having a center button terminal) of a respective battery cell 103. In some embodiments, the lower section 1001 may be 30% or less of the entire length of each of the plurality of battery cells 103. Although the assembly of the battery module is described as the second ends 107 of each of the plurality of battery cells 103 being inserted into respective through-holes 205 from a top side of the battery module (e.g., the side of the base 203 including the front wall 207, the rear wall 209, and the sidewalls 211), in some embodiments, the first end 105 of each of the battery cells 103 may be inserted into respective through-holes 205 from a bottom side of the battery module. In this example, the assembly tooling for the battery module may include tooling for holding the edge support structures 401 and the p-group separators 405 (or the hexagonal p-group separators 701) in place before the battery module is flipped to apply adhesive to each of these components.

Figure 11:
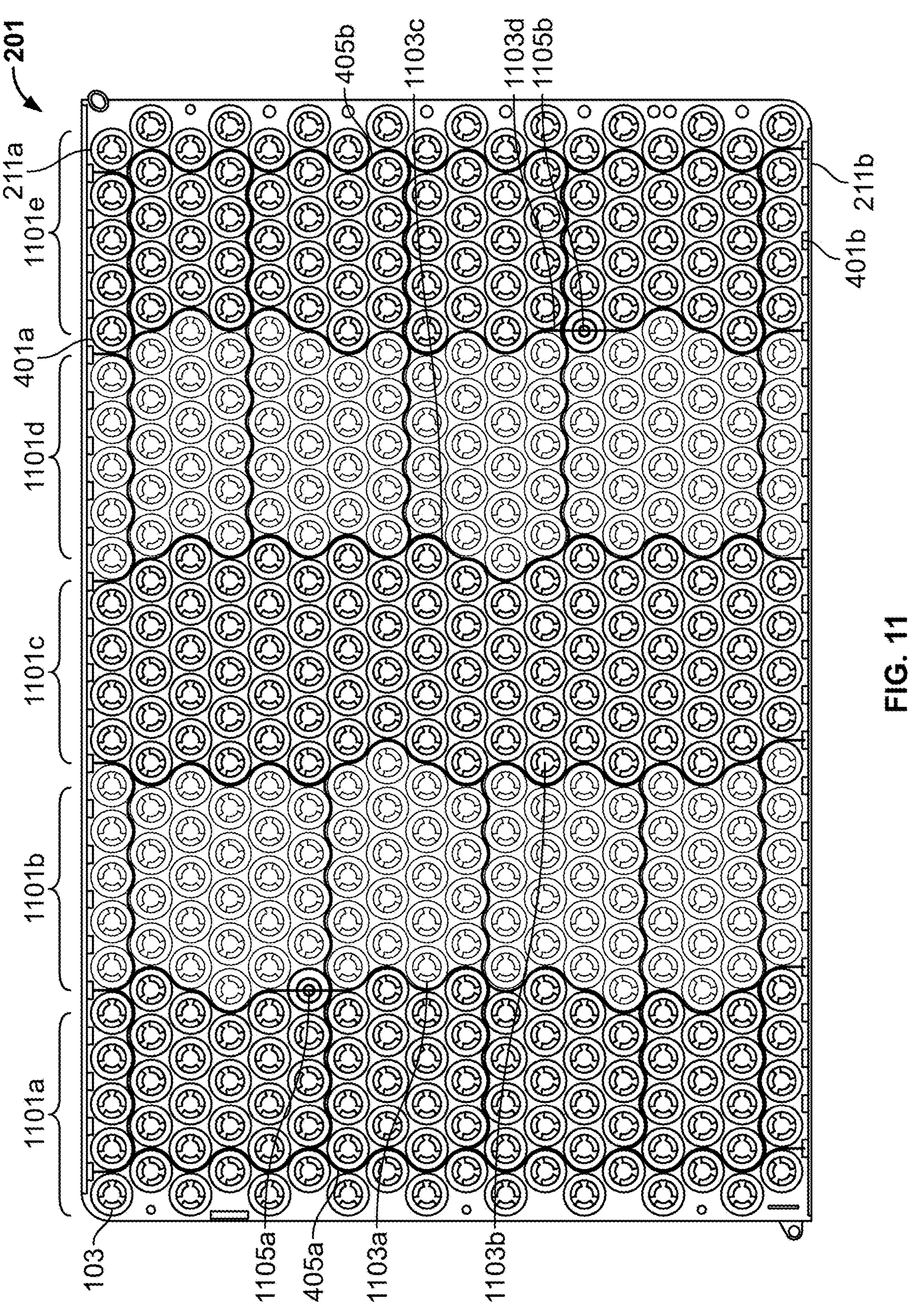
FIG. 11 shows a top view of the battery module assembly of FIG. 6, following the insertion of a plurality of battery cells, in accordance with some embodiments of the present disclosure.

FIG. 11 shows a top view of the battery module assembly of FIG. 6, following the insertion of a plurality of battery cells 103, in accordance with some embodiments of the present disclosure. As shown, the plurality of battery cells 103 may include parallel groups of battery cells 103 at different operating voltages (e.g., parallel groups 1101*a*, 1101*b*, 1101*c*, 1101*d*, and 1101*e*, collectively referred to as parallel groups 1101). The parallel groups 1101 may be separated from each other by segments (e.g., 1103*a*, 1103*b*, 1103*c*, 1103*d*) of the p-group separators 405. In some embodiments, it may be advantageous to include a p-group separator that only includes a structure for separating the parallel groups 1101 from each other, as shown in FIG. 12. As shown, battery cells 103 may be omitted at battery cell locations 1105*a* and 1105*b*, depending on the requirements of the battery module. As shown, the edge support structure 401*a* may support battery cells 103 adjacent to the first sidewall 211*a*, while the edge support structure 401*b* may support battery cells 103 adjacent to the second sidewall 211*b*.

FIG. 12 shows a top view of the battery module assembly of FIG. 5, following the insertion of wavy p-group separators 1201*a*, 1201*b*, 1201*c*, and 1201*d* (collectively referred to as wavy p-group separators 1201) and a plurality of battery cells 103, in accordance with some embodiments of the present disclosure. As described above, in some embodiments, it may be advantageous to include a p-group separator that only includes a segment between adjacent parallel groups 1101 of battery cells 103 (e.g., to reduce cost or manufacturing tolerance requirements). In this case, as shown, a wavy p-group separator 1201 may be included between adjacent parallel groups 1101. Although only certain implementations of p-group separators are shown, it should be understood that the p-group separators may be differently configured depending on the requirements of the battery module.

Figure 13:
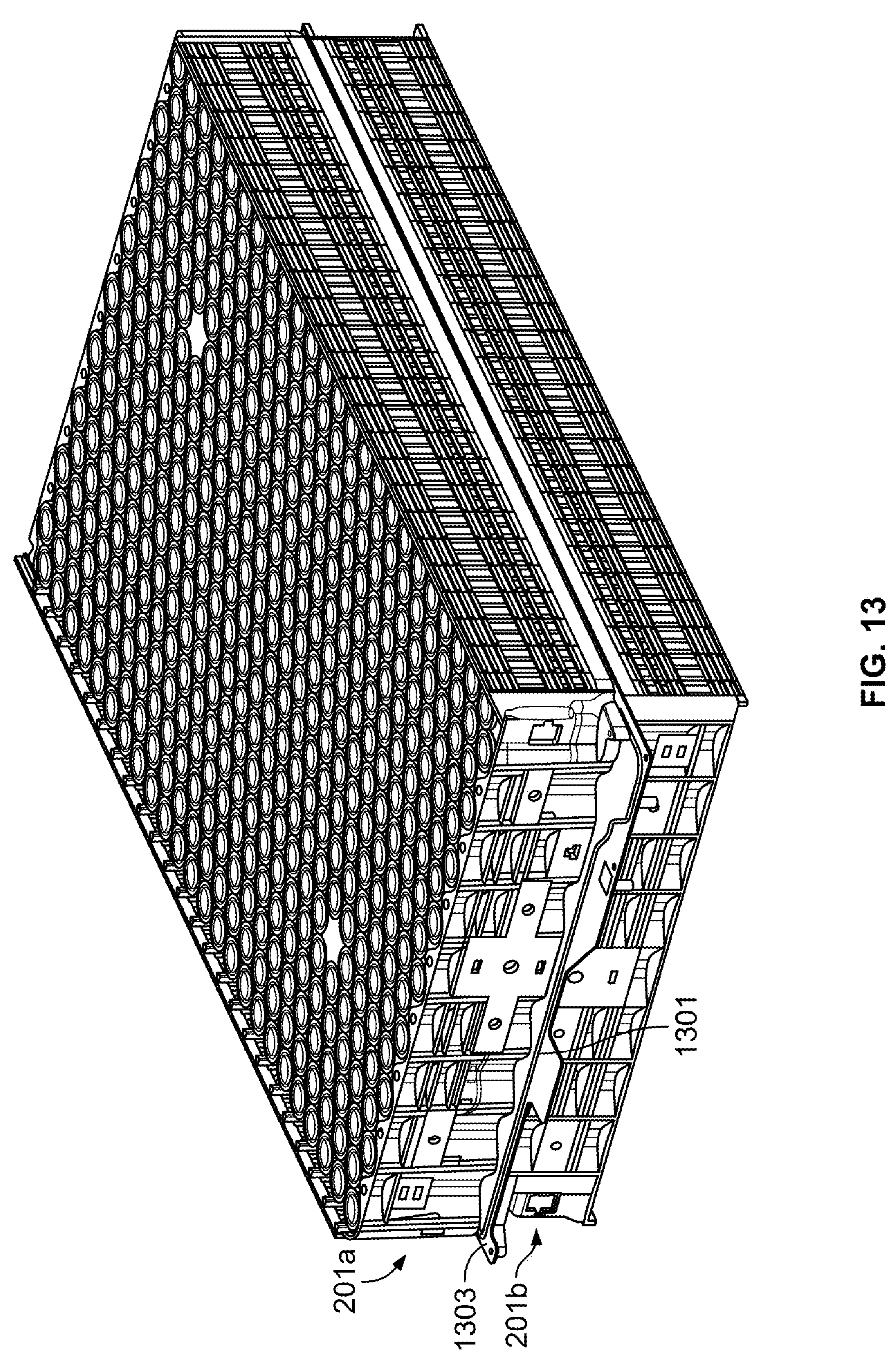
FIG. 13 shows a perspective view of a battery module made up of two of the battery module assemblies of FIG. 9 coupled to opposite sides of a cooling plate, in accordance with some embodiments of the present disclosure.

FIG. 13 shows a perspective view of a battery module made up of two of the battery module assemblies of FIG. 9 coupled to opposite sides of a cooling plate 1301, in accordance with some embodiments of the present disclosure. As shown, two of the battery module assemblies of FIG. 9 (e.g., including cell carriers 201*a* and 201*b*) are coupled to opposite sides of the cooling plate 1301. In particular, the cooling plate 1301 is coupled to the exposed ends 107 of the plurality of battery cells 103 by a thermal interface material. As shown, the cooling plate 1301 may include at least one locating hole 1303 for aligning the cooling plate 1301 with the cell carriers 201*a* and 210*b* during assembly (e.g., also using the locating holes 301*a* and 301*b* discussed above with reference to FIG. 3A).

Figure 14A:
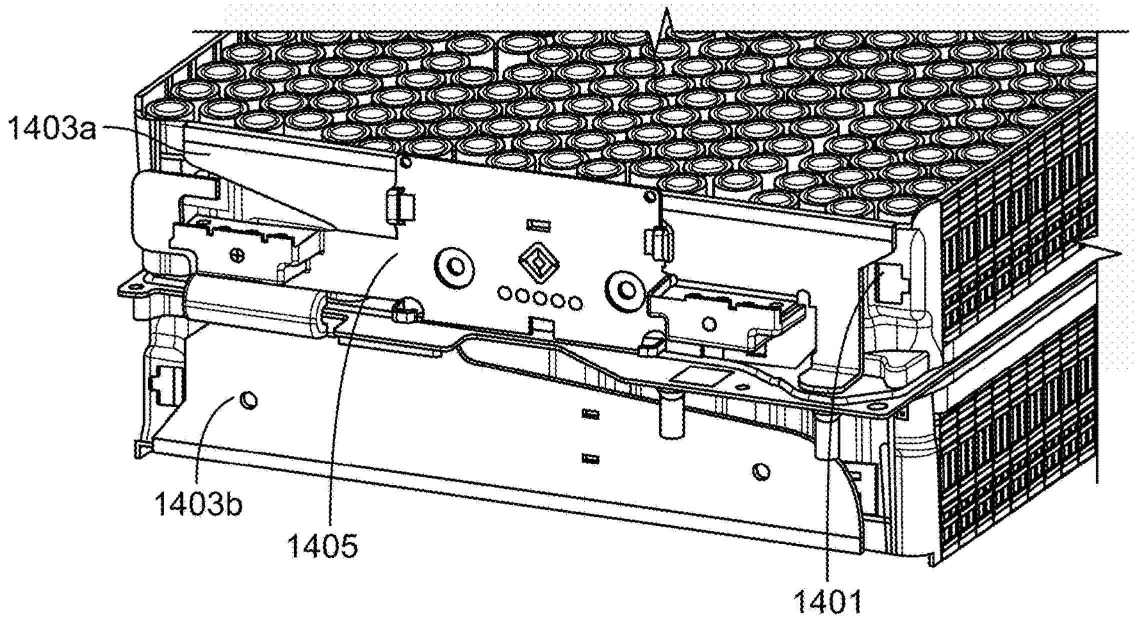
FIG. 14A shows a partial perspective view of a front side of the battery module of FIG. 13, following the installation of components on the front side of the battery module, in accordance with some embodiments of the present disclosure.

FIG. 14A shows a partial perspective view of a front side of the battery module of FIG. 13, following the installation of components on the front side of the battery module, in accordance with some embodiments of the present disclosure. As shown, a thermistor 1401 may be mounted in the thermistor pocket 307 described in FIG. 3B. In some embodiments, the thermistor 1401 is mounted in the thermistor pocket 307 of only one of the cell carriers (e.g., 201*a*). In other embodiments, a thermistor may be mounted in the thermistor pocket of each of the cell carriers (e.g., 201*a* and 201*b* of FIG. 13). In some embodiments, a busbar (1403*a* and 1403*b*) may be mounted to each of the cell carriers 201*a* and 201*b* by the front busbar mounts 309*a* and 309*b* of FIG. 3B. In some embodiments, an isolation bracket 1405 (e.g., an ISO bracket) may be mounted to one of the cell carriers (e.g., 201*a*) by the isolation bracket mounts 311, as described above with reference to, e.g., FIG. 3B. The isolation bracket 1405 may provide mounting features of certain battery module components (e.g., a module mounted printed circuit board and thermistor harness cable management) and provide isolation to certain electrified components. It should be understood that other suitable components may be mounted to the front side of the battery module, based on the requirements of the battery module.

Figure 14B:
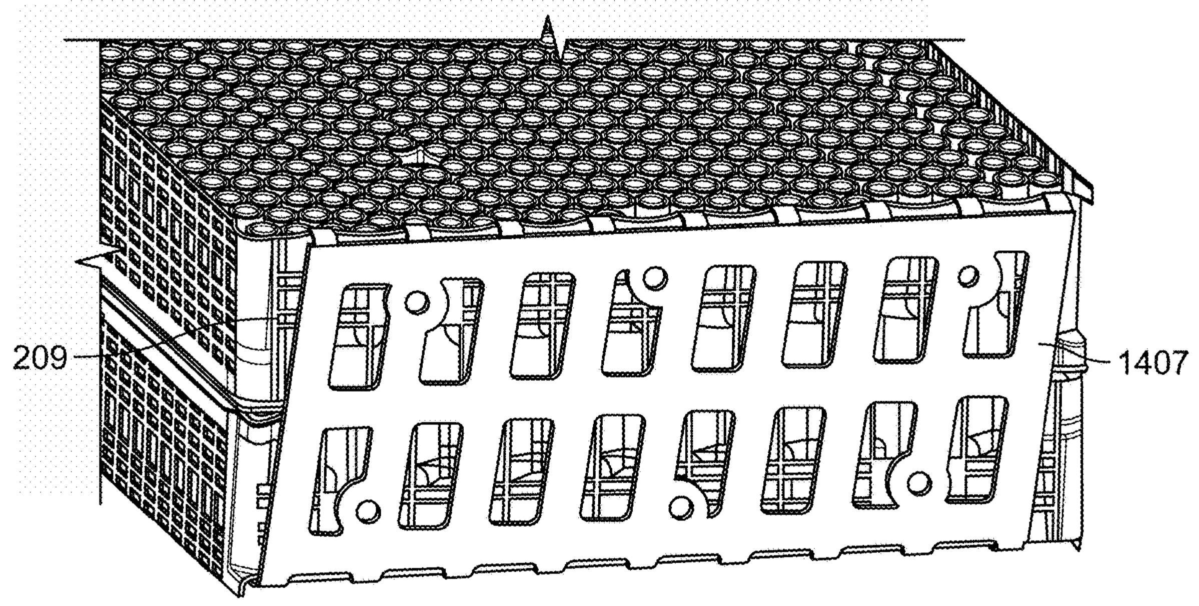
FIG. 14B shows a partial perspective view of a rear side of the battery module of FIG. 13, following the installation of components on the rear side of the battery module, in accordance with some embodiments of the present disclosure.

FIG. 14B shows a partial perspective view of a rear side of the battery module of FIG. 13, following the installation of components on the rear side of the battery module, in accordance with some embodiments of the present disclosure. As shown, a serial busbar 1407 (e.g., electrically connecting battery cells of the two battery module assemblies to each other) may be mounted on the rear side of the battery module by the rear busbar mounts 309*c* and 309*d* of FIG. 3C. It should be understood that other suitable components may be mounted to the rear side of the battery module, based on the requirements of the battery module.

Figure 15:
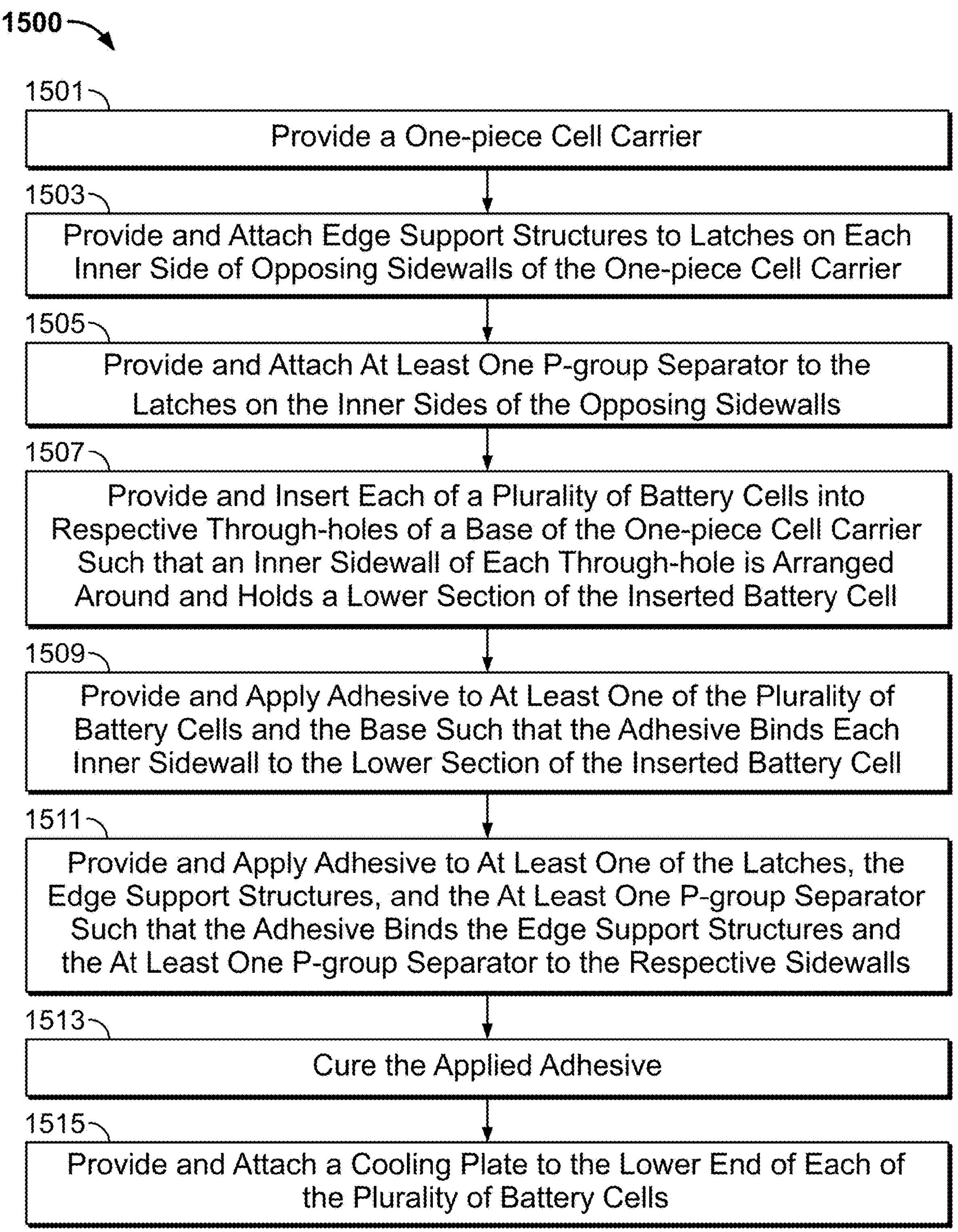
FIG. 15 shows a flowchart of an illustrative process 1500 for assembling the battery module described above, in accordance with some embodiments of the present disclosure.

FIG. 15 shows a flowchart of an illustrative process 1500 for assembling the battery module described above, in accordance with some embodiments of the present disclosure.

At step 1501, a one-piece cell carrier is provided. The one-piece cell carrier may be the one-piece cell carrier 201 (e.g., as illustrated in, e.g., FIG. 2).

At step 1503, edge support structures are provided and attached to latches on each inner side of opposing sidewalls of the one-piece cell carrier. The edge support structures may be the edge support structure 401*a* attached to the latches 213 on an inner side of the first sidewall 211*a* and the end support structure 401*b* attached to the latches 214 on an inner side of the second sidewall 211*b*, as described above with reference to, e.g., FIG. 5.

At step 1505, at least one p-group separator is provided and attached to the latches on the inner sides of the opposing sidewalls. The at least one p-group separator may be any of the p-group separators 405, the hexagonal p-group separators 701, and the wavy p-group separators 1201, as described above with reference to, e.g., any of FIGS. 6, 7, and 12.

At step 1507, each of a plurality of battery cells is provided and inserted into respective through-holes of a base of the one-piece cell carrier such that an inner sidewall of each through-hole is arranged around and holds a lower section of the inserted battery cell. The battery cells may be the battery cells 103 inserted into the respective through-holes 205 of the base 203 such that the inner sidewall 805 of each through-hole 205 is arranged around and holds the lower section of the inserted battery cell 103, as described above with reference to, e.g., FIGS. 3A, 8, 9, and 10. In some embodiments, step 1507 may be performed before step 1505 or step 1503.

At step 1509, adhesive is provided and applied to at least one of the plurality of battery cells and the base such that the adhesive binds each inner sidewall to the lower section of the inserted battery cell. The adhesive may be the adhesive described above with reference to, e.g., FIGS. 9 and 10. In some embodiments, step 1509 may be performed before step 1507.

At step 1511, adhesive is provided and applied to at least one of the latches, the edge support structures, and the at least one p-group separator such that the adhesive binds the edge support structures and the at least one p-group separator to the respective sidewalls. The adhesive may be the adhesive described above with reference to, e.g., FIG. 9. In some embodiments, step 1511 is performed before step 1509 or 1507.

At step 1513, the applied adhesive is cured. The adhesive may be a quick-dry adhesive that cures by setting for the adhesive cure time (e.g., three minutes), as described above with reference to FIG. 9. In some embodiments, the adhesive may be a UV-cure adhesive or a combination of UV-cure adhesive and a quick-dry or slow-dry adhesive and UV light is used to cure the UV-cure adhesive so that subsequent assembly steps can be performed without waiting.

At step 1515, a cooling plate is provided and attached to the lower end of each of the plurality of battery cells. The cooling plate may be the cooling plate 1301 attached to the lower end of each of the plurality of battery cells 103, as described above with reference to, e.g., FIG. 13. In some embodiments, steps 1501-1513 are repeated and the resulting assembly is attached to the opposite side of the cooling plate to form the battery module.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A cell carrier for a battery, the cell carrier comprising:

a base comprising a top side, a bottom side, a plurality of through-holes arranged in a predetermined pattern, and a sidewall that spans a side edge of the base, wherein:

the sidewall comprises an inner surface including a plurality of latches;

each latch of the plurality of latches comprises a pair of angled projections that extend from the inner surface to form a trapezoidal space between the pair of angled projections that receives and accommodates a respective first connector of an edge support structure and a respective second connector extending from a battery group separator;

inner sidewalls of the plurality of through-holes extend from the top side to the bottom side; and each inner sidewall of the plurality of through-holes is configured to hold one battery cell of a plurality of battery cells such that ends of the one battery cell extend outward from the top side and the bottom side.

2. The cell carrier of claim 1, wherein:

the sidewall is a first sidewall;

the side edge of the base is a first side edge;

the base is a rectangular base comprising the first sidewall and a second sidewall;

the first sidewall is arranged along the first side edge that is opposite a second side edge of the rectangular base;

the second sidewall spans along the second side edge; and the rectangular base, the first sidewall, and the second sidewall are integrally formed as a single piece.

3. The cell carrier of claim 1, wherein:

the sidewall is a first sidewall;

the edge support structure is a first edge support structure;

the plurality of latches is a first plurality of latches;

the side edge of the base is a first side edge;

the base is a rectangular base comprising:

a second side edge arranged opposite the first side edge, and a second sidewall extending along the second side edge, the second sidewall comprising a second plurality of latches integrally formed along an inner surface of the second sidewall and spaced apart from each other in a direction parallel to the second side edge;

each latch of the second plurality of latches comprises a respective pair of projections extending from the inner surface of the second sidewall; and each latch of the second plurality of latches is configured to receive and accommodate a respective third connector of a second edge support structure and a respective fourth connector extending from the battery group separator.

4. The cell carrier of claim 1, wherein:

the sidewall is a first sidewall;

the base is a rectangular base comprising:

a front wall formed along a front edge of the rectangular base, a rear wall, opposite the front wall, formed along a rear edge of the rectangular base, and a second sidewall opposite the first sidewall; and the rectangular base, the first sidewall, the second sidewall, the front wall, and the rear wall are integrally formed as a single piece.

5. The cell carrier of claim 1, wherein the base further comprises:

a front wall comprising a first plurality of mounts arranged in a first pattern, the first plurality of mounts configured to attach a first component to the front wall; and a rear wall comprising a second plurality of mounts arranged in a second pattern, the second plurality of mounts configured to attach a second component to the rear wall, wherein the first pattern is different from the second pattern and the first component is different from the second component.

6. The cell carrier of claim 1, wherein the cell carrier comprises a plastic material and is formed by injection molding as a single piece.

7. A battery, comprising:

a one-piece cell carrier configured to interconnect a plurality of battery cells, wherein the one-piece cell carrier comprises:

a base comprising a top side, a bottom side, a plurality of through-holes arranged in a predetermined pattern, and a sidewall that spans a side edge of the base, wherein:

the sidewall comprises an inner surface including a plurality of latches, each latch of the plurality of latches comprises a pair of angled projections that extend from the inner surface to form a trapezoidal space between the pair of angled projections that receives and accommodates a respective first connector of an edge support structure and a respective second connector extending from a battery group separator, each through-hole of the plurality of through-holes comprises a respective inner sidewall, each respective inner sidewall of the plurality of through-holes extends from the top side to the bottom side, and each respective inner sidewall of the plurality of through-holes is configured to hold one battery cell of the plurality of battery cells such that respective opposite ends of the one battery cell extend outward from the top side and the bottom side of the base; and one or more other walls is integrally formed with the base, each of the one or more other walls being arranged along a respective edge of the base.

8. The battery of claim 7, wherein:

the sidewall is a first sidewall;

the plurality of latches is a first plurality of latches;

the side edge is a first side edge;

the one or more other walls comprises a second sidewall, opposite the first sidewall, formed along a second side edge of the base; and the second sidewall comprises a second plurality of latches integrally formed along an inner surface of the second sidewall and spaced apart from each other in a direction along the second side edge of the base.

9. The battery of claim 8, wherein:

the edge support structure is a first edge support structure;

the battery further comprises a second edge support structure;

the first edge support structure is configured to:

be attached to the first plurality of latches of the first sidewall, and support a first group of battery cells of the plurality of battery cells adjacent to the first sidewall; and the second edge support structure is configured to:

be attached to the second plurality of latches of the second sidewall, and support a second group of battery cells of the plurality of battery cells adjacent to the second sidewall.

10. The battery of claim 7, further comprising a plurality of battery group separators, including the battery group separator, wherein each respective battery group separator of the plurality of battery group separators comprises at least one respective segment configured to be arranged in free space between adjacent parallel groups of the plurality of battery cells.

11. The battery of claim 7, wherein:

the sidewall is a first sidewall;

the side edge of the base is a first side edge of the base; and the one or more other walls comprise a second sidewall, opposite the first sidewall, formed along a second side edge of the base.

12. The battery of claim 8, further comprising a busbar and an isolation bracket, wherein:

the one or more other walls further comprise:

a front wall formed along a third side edge of the base, the front wall comprising an isolation bracket mount, and a rear wall, opposite the front wall, formed along a fourth side edge of the base, the rear wall comprising a busbar mount;

the isolation bracket is mounted to the isolation bracket mount; and the busbar is mounted to the busbar mount.

13. The battery of claim 12, further comprising a thermistor, wherein:

the front wall comprises a thermistor pocket integrally formed therein; and the thermistor is mounted in the thermistor pocket.

14. The battery of claim 7, wherein:

each battery cell of the plurality of battery cells comprises a respective cylindrical sidewall; and each respective inner sidewall of the plurality of through-holes comprises a respective accommodating geometry corresponding to respective cylindrical sidewalls of respective battery cells of the plurality of battery cells.

15. The battery of claim 7, wherein the one-piece cell carrier comprises a plastic material and is formed by injection molding as one piece.

16. A method of assembling a battery, the method comprising:

providing a one-piece cell carrier, a plurality of battery cells, and an adhesive, wherein the one-piece cell carrier comprises:

a rectangular base comprising a top side, a bottom side opposite the top side, a plurality of through-holes arranged in a predetermined pattern, and a sidewall that spans a side edge of the rectangular base, wherein:

the sidewall comprises an inner surface including a plurality of latches;

each latch of the plurality of latches comprises a pair of angled projections that extend from the inner surface to form a trapezoidal space between the pair of angled projections that receives and accommodates a respective first connector of an edge support structure and a respective second connector extending from a battery group separator;

inner sidewalls of the plurality of through-holes extend from the top side to the bottom side; and each inner sidewall of the plurality of through-holes is configured to hold one battery cell of the plurality of battery cells such that ends of the one battery cell extend outward from the top side and the bottom side;

inserting each of the plurality of battery cells into a respective through-hole such that a respective top end of each of the plurality of battery cells extends from the top side and a respective bottom end of each of the plurality of battery cells extends from the bottom side;

selectively applying the adhesive to at least one of the plurality of battery cells and the rectangular base such that the adhesive binds at least one inner sidewall to one of the plurality of battery cells; and curing the adhesive.

17. The method of claim 16, wherein:

the side edge is a first side edge;

the sidewall is a first sidewall integrally formed with the rectangular base along the first side edge of the rectangular base;

the one-piece cell carrier comprises a second sidewall, opposite the first sidewall, integrally formed with the rectangular base along a second side edge of the rectangular base;

the edge support structure is a first edge support structure configured to support a first group of battery cells of the plurality of battery cells along the first side edge; and the method further comprises:

providing the first edge support structure;

providing a second edge support structure, wherein the second edge support structure is configured to support a second group of battery cells of the plurality of battery cells along the second side edge; and before inserting each of the plurality of battery cells in a respective through-hole, attaching the first edge support structure to the inner surface of the first sidewall, and attaching the second edge support structure to an inner surface of the second sidewall.

18. The method of claim 17, wherein the battery group separator is one of a plurality of battery group separators, the method further comprising:

providing the plurality of battery group separators, each comprising at least one respective segment configured to be disposed in a respective free space between respective adjacent parallel groups of battery cells of the plurality of battery cells;

after attaching the first edge support structure and the second edge support structure and before inserting each of the plurality of battery cells in a respective through-hole of the plurality of through-holes, attaching a respective first end of each of the plurality of battery group separators to the inner surface of the first sidewall; and attaching a respective second end, opposite to the first end, of each of the plurality of battery group separators to the inner surface of the second sidewall.

19. The method of claim 18, further comprising:

providing a cooling plate; and attaching, after inserting each of the plurality of battery cells in a respective through-hole of the plurality of through-holes, the cooling plate to a lower end of each of the plurality of battery cells.

* * * * *